(12) United States Patent
Lee et al.

(10) Patent No.: US 10,862,156 B2
(45) Date of Patent: Dec. 8, 2020

(54) POSITIVE ELECTRODE ACTIVE MATERIAL FOR SECONDARY BATTERY AND SECONDARY BATTERY INCLUDING THE SAME

(71) Applicant: LG Chem, Ltd., Seoul (KR)

(72) Inventors: Sang Wook Lee, Daejeon (KR); Wang Mo Jung, Daejeon (KR); Byung Chun Park, Daejeon (KR); Ju Kyung Shin, Daejeon (KR); Ji Hoon Ryu, Daejeon (KR); Sang Min Park, Daejeon (KR)

(73) Assignee: LG Chem, Ltd.

( * ) Notice: Subject to any disclaimer, the term of this patent is extended or adjusted under 35 U.S.C. 154(b) by 228 days.

(21) Appl. No.: 15/550,133

(22) PCT Filed: Sep. 28, 2016

(86) PCT No.: PCT/KR2016/010862
§ 371 (c)(1),
(2) Date: Aug. 10, 2017

(87) PCT Pub. No.: WO2017/057900
PCT Pub. Date: Apr. 6, 2017

(65) Prior Publication Data
US 2018/0048015 A1  Feb. 15, 2018

(30) Foreign Application Priority Data
Sep. 30, 2015 (KR) .................. 10-2015-0137918

(51) Int. Cl.
*H01M 10/052* (2010.01)
*H01M 4/131* (2010.01)
(Continued)

(52) U.S. Cl.
CPC .......... *H01M 10/052* (2013.01); *C01G 53/50* (2013.01); *H01M 2/10* (2013.01); *H01M 4/131* (2013.01);
(Continued)

(58) Field of Classification Search
CPC .... H01M 4/131; H01M 4/1391; H01M 4/505; H01M 4/52; H01M 4/525
See application file for complete search history.

(56) References Cited

U.S. PATENT DOCUMENTS

2004/0200998 A1  10/2004  Park et al.
2009/0029253 A1  1/2009  Itou et al.
(Continued)

FOREIGN PATENT DOCUMENTS

CN  103326016 A  9/2013
CN  103515606 A  1/2014
(Continued)

OTHER PUBLICATIONS

Search report from International Application No. PCT/KR2016/010862, dated Jan. 9, 2017.
(Continued)

*Primary Examiner* — Eric R Smith
(74) *Attorney, Agent, or Firm* — Lerner, David, Littenberg, Krumholz & Mentlik, LLP

(57) ABSTRACT

The present invention relates to a positive electrode active material for a secondary battery and a secondary battery including the same, wherein the positive electrode active material includes a core, a shell disposed to surround the core, and a buffer layer which is disposed between the core and the shell and includes pores and a three-dimensional network structure connecting the core and the shell, wherein the core, the shell, and the three-dimensional network structure of the buffer layer each independently includes a
(Continued)

polycrystalline lithium composite metal oxide of Formula 1 including a plurality of grains, and the grains have an average grain diameter of 50 nm to 150 nm.

19 Claims, 3 Drawing Sheets

(51) Int. Cl.
| | |
|---|---|
| *H01M 4/505* | (2010.01) |
| *H01M 4/525* | (2010.01) |
| *C01G 53/00* | (2006.01) |
| *H01M 2/10* | (2006.01) |
| *H01M 4/36* | (2006.01) |
| *H01M 10/058* | (2010.01) |

(52) U.S. Cl.
CPC .............. *H01M 4/36* (2013.01); *H01M 4/505* (2013.01); *H01M 4/525* (2013.01); *H01M 10/058* (2013.01); *C01P 2004/03* (2013.01); *C01P 2006/40* (2013.01); *H01M 2/1016* (2013.01)

(56) References Cited

U.S. PATENT DOCUMENTS

| | | | |
|---|---|---|---|
| 2009/0068561 A1* | 3/2009 | Sun | H01M 4/131 429/223 |
| 2013/0202966 A1 | 8/2013 | Yu et al. | |
| 2014/0158932 A1* | 6/2014 | Sun | H01M 4/13 252/182.1 |
| 2014/0205901 A1 | 7/2014 | Nagai et al. | |
| 2015/0104708 A1 | 4/2015 | Bi et al. | |
| 2015/0132652 A1* | 5/2015 | Ito | C01G 45/006 429/223 |
| 2015/0171424 A1 | 6/2015 | Kawai | |
| 2016/0093885 A1 | 3/2016 | Kamata et al. | |

FOREIGN PATENT DOCUMENTS

| | | |
|---|---|---|
| CN | 104409700 A | 3/2015 |
| CN | 104521039 A | 4/2015 |
| EP | 2882013 A1 | 6/2015 |
| JP | 2006216374 A | 8/2006 |
| JP | 4726896 B2 | 7/2011 |
| JP | 2013051172 A | 3/2013 |
| JP | 2013134871 A | 7/2013 |
| KR | 20030083476 A | 10/2003 |
| KR | 20110083383 A | 7/2011 |
| WO | 2014181891 A1 | 11/2014 |
| WO | 2016204563 A1 | 12/2016 |

OTHER PUBLICATIONS

Extended European Search Report for Application No. EP16852046.8 dated Apr. 5, 2018.

Jang-Yeon Hwang et al., "Radially aligned hierarchical columnar structure as a cathode material for high energy density sodium-ion batteries", Nature Communications, Apr. 17, 2015, vol. 6, No. 1, XP055446508.

Chinese Search Report for Application No. CN2016800123418 dated Dec. 4, 2019.

* cited by examiner

POSITIVE ELECTRODE ACTIVE MATERIAL FOR SECONDARY BATTERY AND SECONDARY BATTERY INCLUDING THE SAME

CROSS-REFERENCE TO RELATED APPLICATIONS

The present application is a national phase entry under 35 U.S.C. § 371 of International Application No. PCT/KR2016/010862 filed Sep. 28, 2016, which claims priority from Korean Patent Application No. 10-2015-0137918, filed Sep. 30, 2015, all of which are hereby incorporated herein by referenced.

TECHNICAL FIELD

The present invention relates to a positive electrode active material for a secondary battery, which may exhibit high output characteristics, and a secondary battery including the same.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

However, lithium secondary batteries have limitations in that lifetime rapidly decreases as charge and discharge are repeated. In particular, these limitations are more serious at high temperature. The reason for this is due to a phenomenon that occurs when an electrolyte is decomposed or an active material is degraded due to moisture in the battery or other effects, and the internal resistance of the battery increases.

Accordingly, a positive electrode active material for a lithium secondary battery, which has been actively researched and developed and is currently being used, is layer-structured $LiCoO_2$. Since $LiCoO_2$ has excellent life characteristics and charge and discharge efficiency, the $LiCoO_2$ is the most widely used, but there is a limitation in using the $LiCoO_2$ in high-capacity battery technology due to low structural stability.

As a positive electrode active material alternative to $LiCoO_2$, various lithium transition metal oxides, such as $LiNiO_2$, $LiMnO_2$, $LiMn_2O_4$, $LiFePO_4$, and $Li(Ni_pCo_qMn_r)O_2$, have been developed. Among these oxides, with respect to $LiNiO_2$, it is advantageous in that $LiNiO_2$ exhibits battery characteristics of high discharge capacity, but the synthesis thereof may be difficult by a simple solid phase reaction, and thermal stability and cycle characteristics may be low. Also, a lithium manganese-based oxide, such as $LiMnO_2$ or $LiMn_2O_4$, is advantageous in that the thermal stability is excellent and the price is low, but capacity may be low and high-temperature characteristics may be poor. Particularly, with respect to $LiMn_2O_4$, some have been commercialized as low-cost products, but life characteristics were poor due to structural distortion (Jahn-Teller distortion) caused by $Mn^{+3}$. Furthermore, since $LiFePO_4$ is inexpensive and has excellent stability, a significant amount of research has currently been conducted for the application of $LiFePO_4$ for a hybrid electric vehicle (HEV). However, the application to other areas may be difficult due to low conductivity.

Thus, a lithium nickel manganese oxide, $Li(Ni_pCo_qMn_r)O_2$ (where, p, q, and r each independently are an atomic fraction of oxide composition elements, wherein $0<p\le1$, $0<q\le1$, $0<r\le1$, and $0<p+q+r\le1$), is a material which is currently very much in the spotlight as a positive electrode active material alternative to $LiCoO_2$. This material is less expensive than $LiCoO_2$ and may be used in high voltage and high capacity applications, but $Li(Ni_pCo_qMn_r)O_2$ has limitations in that rate capability and life characteristics at high temperature may be poor.

Therefore, a method of preparing a positive electrode active material, which may improve lithium secondary battery performance through changes in the composition of the lithium transition metal oxide or the control of crystal structure, is urgently required.

DISCLOSURE OF THE INVENTION

Technical Problem

An aspect of the present invention provides a positive electrode active material for a secondary battery, which may exhibit high output characteristics by controlling a grain size, and a method of preparing the same.

Another aspect of the present invention provides a positive electrode for a secondary battery, a lithium secondary battery, a battery module, and a battery pack which include the positive electrode active material.

Technical Solution

According to an aspect of the present invention, there is provided a positive electrode active material for a secondary battery including: a core; a shell disposed to surround the core; and a buffer layer which is disposed between the core and the shell and includes pores and a three-dimensional network structure connecting the core and the shell, wherein the core, the shell, and the three-dimensional network structure of the buffer layer each independently include a polycrystalline lithium composite metal oxide of Formula 1 including a plurality of grains, and an average grain diameter of the grains is in a range of 50 nm to 150 nm:

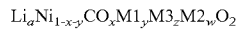

$$Li_aNi_{1-x-y}Co_xM1_yM3_zM2_wO_2 \quad [\text{Formula 1}]$$

(in Formula 1, M1 includes at least one element selected from the group consisting of aluminum (Al) and manganese (Mn), M2 includes at least one element selected from the group consisting of zirconium (Zr), titanium (Ti), magnesium (Mg), tantalum (Ta), and niobium (Nb), M3 includes at least one element selected from the group consisting of tungsten (W), molybdenum (Mo), and chromium (Cr), $1.0\le a\le1.5$, $0<x\le0.5$, $0<y\le0.5$, $0.0005\le z\le0.03$, $0\le w\le0.02$, and $0<x+y\le0.7$).

According to another aspect of the present invention, there is provided a method of preparing the positive electrode active material for a secondary battery including: preparing a precursor-containing reaction solution by adding an ammonium cation-containing complexing agent and a basic compound to a metal-containing solution, which is prepared by mixing a nickel raw material, a cobalt raw material, and a M1 raw material (where, M1 includes at least one element selected from the group consisting of Al and Mn), and performing a co-precipitation reaction in a pH range of 11 to 13; growing the precursor by adding an ammonium cation-containing complexing agent and a basic compound to the precursor-containing reaction solution until a pH of the reaction solution reaches 8 or more to less than 11; and mixing the grown precursor with a lithium raw material and performing primary sintering at 500° C. to 700° C. and secondary sintering at 700° C. to 900° C., wherein a M3 raw material (where, M3 includes at least one element selected from the group consisting of W, Mo, and Cr) is further added in a molar ratio of 0.0005 to 0.03 based on a total mole of the metallic elements except lithium in a finally prepared lithium composite metal oxide during at least one process of the preparing of the metal-containing solution and the mixing of the grown precursor with the lithium raw material.

According to another aspect of the present invention, there is provided a positive electrode for a secondary battery, a lithium secondary battery, a battery module, and a battery pack which include the above-described positive electrode active material.

Details of other embodiments of the present invention are included in the following detailed description.

Advantageous Effects

A positive electrode active material for a secondary battery according to the present invention may exhibit excellent output characteristics, particularly excellent output characteristics at low temperature, by controlling a grain size.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DESCRIPTION OF THE SYMBOLS

Figure 1:
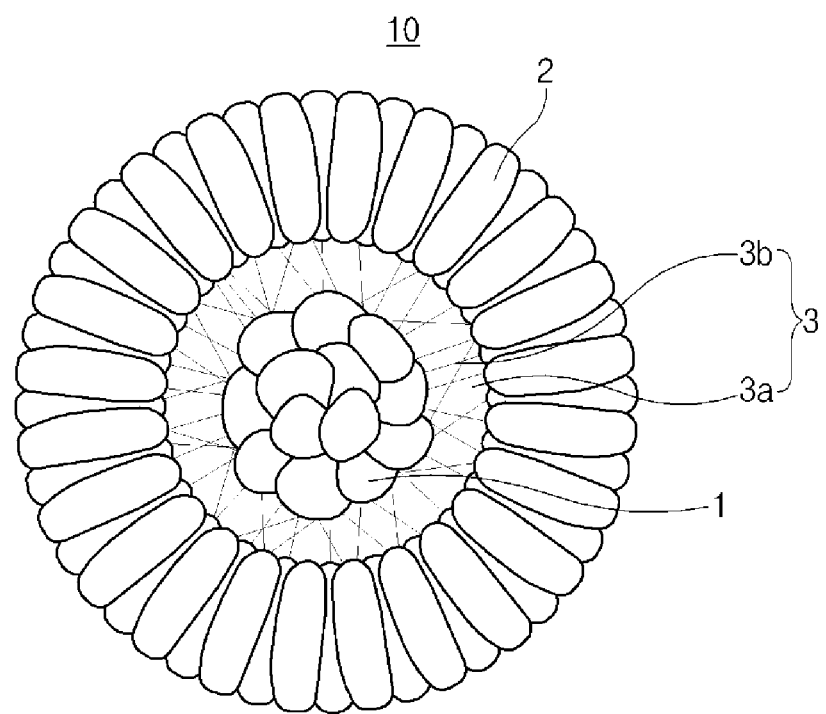
FIG. 1 is a cross-sectional structural view schematically illustrating a positive electrode active material for a secondary battery according to an embodiment of the present invention.

1: Core
2: Shell
3: Buffer layer
3a: Pore
3b: Three-dimensional network structure
10: Positive electrode active material

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the present invention, when preparing a positive electrode active material for a secondary battery having a structure in which a three-dimensional network-structured buffer layer connected to a core and a shell is formed between the core and the shell of a particle having a core-shell structure, output characteristics and life characteristics of the secondary battery may be improved by controlling a size of grains.

That is, a positive electrode active material for a secondary battery according to an embodiment of the present invention includes: a core; a shell disposed to surround the core; and a buffer layer which is disposed between the core and the shell and includes pores and a three-dimensional network structure connecting the core and the shell, wherein the core, the shell, and the three-dimensional network structure of the buffer layer each independently include a polycrystalline lithium composite metal oxide of the following Formula 1 including a plurality of grains, and the grains have an average grain diameter of 50 nm to 150 nm:

$$Li_aNi_{1-x-y}Co_xM1_yM3_zM2_wO_2 \quad \text{[Formula 1]}$$

in Formula 1, M1 includes at least one element selected from the group consisting of aluminum (Al) and manganese (Mn), M2 includes at least one element selected from the group consisting of zirconium (Zr), titanium (Ti), magnesium (Mg), tantalum (Ta), and niobium (Nb), M3 includes at least one element selected from the group consisting of tungsten (W), molybdenum (Mo), and chromium (Cr), and a, x, y, z, and w are each independently an atomic fraction of oxide composition elements, wherein $1.0 \le a \le 1.5$, $0 < x \le 0.5$, $0 < y \le 0.5$, $0.0005 \le z \le 0.03$, $0 \le w \le 0.02$, and $0 < x+y \le 0.7$.

The composition of the lithium composite metal oxide of Formula 1 is an average composition of an entire positive electrode active material particle.

Specifically, in Formula 1, M3, as an element corresponding to group 6 (group VIB) of the Periodic Table, plays a role in suppressing particle growth in a sintering process during the preparation of the active material particle. The M3 may be present in a position, at which the Ni, Co, or M1 element should be present, by substituting a portion of the Ni, Co, or M1 in a crystal structure of the positive electrode active material, or may form a lithium oxide by reacting with lithium. Accordingly, the diameter of the grain may be controlled by controlling an amount and time of addition of the M3. Specifically, the M3 may be at least one element selected from the group consisting of W, Mo, and Cr, and, for example, may be at least one element of W and Cr.

The M3 may be included in an amount corresponding to z in the lithium composite metal oxide of Formula 1, that is, $0.0005 \le z \le 0.03$. In a case in which z is less than 0.0005 or greater than 0.03, realization of an active material satisfying the above-described characteristics is not easy and, as a result, an output and life characteristics improvement effect may be insignificant. The M3, for example, may be included in an amount satisfying $0.001 \le z \le 0.01$, in consideration of realization of the particle structure due to the control of the amount of the M3 and the resulting significant battery characteristics improvement effect.

Also, in the lithium composite metal oxide of Formula 1, lithium (Li) may be included in an amount corresponding to a, that is, $1.0 \le a \le 1.5$. When a is less than 1.0, there is a concern that capacity may be reduced, and, when a is greater than 1.5, since the particles are sintered in the sintering process, the preparation of the active material may be difficult. The Li, for example, may be included in an amount satisfying $1.0 \leq a \leq 1.15$, in consideration of balance between a significant capacity characteristics improvement effect due to the control of the amount of the Li and sinterability during the preparation of the active material.

Furthermore, in the lithium composite metal oxide of Formula 1, cobalt (Co) may be included in an amount corresponding to x, that is, $0 < x \leq 0.5$. In a case in which x is 0, capacity characteristics may be reduced, and, in a case in which x is greater than 0.5, costs may be increased. The Co, for example, may be included in an amount satisfying $0.10 \leq x \leq 0.35$, in consideration of the significant capacity characteristics improvement effect due to the inclusion of the Co.

Also, in the lithium composite metal oxide of Formula 1, M1 may be at least one selected from the group consisting of Al and Mn, and, for example, may be Al or Mn. The M1 may be included in an amount corresponding to y, that is, $0 < y \leq 0.5$. In a case in which y is 0, an improvement effect due to the inclusion of the M1 may not be obtained, and, in a case in which y is greater than 0.5, output characteristics and capacity characteristics of the battery may be degraded. The M1, for example, may be included in an amount satisfying $0.1 \leq y \leq 0.3$, in consideration of a significant battery characteristics improvement effect due to the inclusion of the M1 element.

Furthermore, the Ni, Co, and M1 elements in the lithium composite metal oxide or the lithium composite metal oxide of Formula 1 may be partially substituted or doped with another element, that is, M2, to improve the battery characteristics by controlling the distribution of the metallic elements in the active material. The M2 may specifically be at least one element selected from the group consisting of Zr, Ti, Mg, Ta, and Nb, and, for example, may be Zr or Ti.

The M2 element may be included in an amount corresponding to w, that is, $0 \leq w \leq 0.02$, within a range in which characteristics of the active material are not degraded.

Also, the lithium composite metal oxide of Formula 1 is a polycrystalline compound including a plurality of grains, wherein the grain diameter is optimized by controlling the amount of the M3 element included in the lithium composite metal oxide and sintering conditions during the preparation of the lithium composite metal oxide so as to obtain high output characteristics. In a case in which the lithium composite metal oxide is polycrystalline, the output characteristics may be improved. Furthermore, when the average grain diameter of the grains constituting the polycrystalline lithium composite metal oxide is in a range of 50 nm to 150 nm, stability of the crystal structure is further increased and, as a result, the output characteristics improvement effect is more significant. Specifically, in a case in which the diameter is outside the above-described average grain diameter range, the output characteristics may be degraded. Particularly, in a case in which the average grain diameter is less than 50 nm, there is a concern that the life characteristics may be reduced due to the formation of an unstable crystal structure, and, in a case in which the average grain diameter is greater than 150 nm, there is a concern that the life characteristics may be reduced due to the occurrence of cracks. The average grain diameter of primary particles, for example, may be in a range of 80 nm to 100 nm, in consideration of the significant output characteristics improvement effect due to the control of the grain diameter.

In the present invention, the expression "polycrystal" denotes a crystalline body which is composed of two or more crystal grains. Also, in the present invention, the average grain diameter of the grains may be quantitatively analyzed by using X-ray diffraction analysis of the lithium composite metal oxide particles. For example, the average grain diameter of the primary particles may be quantitatively analyzed by putting the polycrystalline lithium composite metal oxide particles in a holder and analyzing diffraction patterns obtained by irradiation of the particles with X-rays.

The positive electrode active material for a lithium secondary battery according to the embodiment of the present invention includes a core including the polycrystalline lithium composite metal oxide of Formula 1, and a shell disposed to surround the core and including the polycrystalline lithium composite metal oxide of Formula 1, and also further includes a buffer layer which is disposed between the core and the shell to surround the core and includes pores and a three-dimensional network structure of the polycrystalline lithium composite metal oxide of Formula 1 connecting the core and the shell.

Thus, with respect to the positive electrode active material for a secondary battery according to the embodiment of the present invention, since the three-dimensional network-structured buffer layer connected to the core and the shell is formed between the core and the shell of the particle having a core-shell structure, destruction of the active material due to a rolling process during the preparation of an electrode is minimized and reactivity with an electrolyte solution is maximized. Also, since particles constituting the shell have a crystal structure aligned for facilitating intercalation and deintercalation of lithium ions, the output characteristics and life characteristics of the secondary battery may be improved.

FIG. 1 is a cross-sectional structural view schematically illustrating the positive electrode active material for a secondary battery according to the embodiment of the present invention. FIG. 1 is only an example for describing the present invention and the scope of the present invention is not limited thereto.

Referring to FIG. 1, a positive electrode active material 10 for a secondary battery according to the embodiment of the present invention includes a core 1, a shell 2 surrounding the core, and a buffer layer 3 disposed between the core and the shell to surround the core, wherein the buffer layer 3 includes pores 3a and a three-dimensional network structure 3b.

Specifically, in the positive electrode active material 10, the core 1 includes the polycrystalline lithium composite metal oxide (hereinafter, referred to as 'first lithium composite metal oxide') of Formula 1.

Also, the core 1 may be composed of a single particle of the first lithium composite metal oxide, or may be composed of a secondary particle in which primary particles of the first lithium composite metal oxide are agglomerated. In this case, the primary particles may be uniform, or may be non-uniform.

Furthermore, in the positive electrode active material 10, the shell 2 includes the polycrystalline lithium composite metal oxide (hereinafter, referred to as 'second lithium composite metal oxide').

The second lithium composite metal oxide may be crystal oriented particles radially grown from a center of the positive electrode active material to the outside. Thus, since the particles of the second lithium composite metal oxide constituting the shell have a crystal orientation in a direction facilitating the intercalation and deintercalation of lithium, higher output characteristics may be achieved in comparison to particles not having the same crystal orientation.

Specifically, in the shell 2, the particles of the second lithium composite metal oxide may have various shapes such as those of a polygon, such as a hexahedron, a cylinder, a fiber, or a flake. Specifically, the particles of the second lithium composite metal oxide may have a fibrous shape having an aspect ratio of 1.5 or more. In a case in which the aspect ratio of the particles of the second lithium composite metal oxide constituting the shell is less than 1.5, since the particle growth may be non-uniform, electrochemical properties may be deteriorated. In this case, the aspect ratio denotes a ratio of a length in a major axis direction of the second lithium composite metal oxide particle to a length in a minor axis direction thereof. Also, the shell 2 may further include pores formed between the particles of the second lithium composite metal oxide.

Also, the buffer layer 3, which includes the pores 3a and the three-dimensional network structure 3b connecting the core and the shell, is disposed between the core 1 and the shell 2.

In the buffer layer 3, the pores 3a are formed in a process in which the active material particles are converted into a hollow structure by controlling a pH of a reactant during the preparation of the active material, wherein, since the pores 3a form spaces between the core 1 and the shell 2, the pores 3a have a buffer action during rolling for the preparation of the electrode. Also, since the pores allow the electrolyte solution to easily penetrate into the active material to be able to react with the core, the pores play a role in increasing a reaction area of the active material with respect to the electrolyte solution. The pores 3a may be included in an amount of 30 vol % or less, for example, 2 vol % to 30 vol %, based on a total volume of the positive electrode active material. When the pores are included within the above range, the pores may have an excellent buffer action without a decrease in mechanical strength of the active material and an effect of increasing the reaction area with respect to the electrolyte solution. The pores 3a, for example, may be included in an amount of 5 vol % to 20 vol % based on the total volume of the positive electrode active material in consideration of the significant improvement effect due to the pore formation. In this case, porosity of the buffer layer may be measured by cross-sectional analysis of the particle using a focused ion beam (FIB) or mercury intrusion porosimetry.

Furthermore, in the buffer layer 3, the three-dimensional network structure 3b is formed in a process in which the active material particles are converted into the hollow structure to form the inner core during the preparation of the active material, wherein the three-dimensional network structure 3b is connected between the core and the shell to play a role in supporting the space between the core 1 and the shell 2. Accordingly, similar to the core 1 and the shell 2, the three-dimensional network structure 3b includes the polycrystalline lithium composite metal oxide (hereinafter, referred to as 'third lithium composite metal oxide') of Formula 1.

Also, in the positive electrode active material according to the embodiment of the present invention, at least one metallic element of the nickel, the M1, and the cobalt included in the polycrystalline lithium composite metal oxide of Formula 1 may be distributed while having an increasing or decreasing concentration gradient in the active material particle.

In the present invention, the expression "concentration gradient or concentration profile of the metallic element in the active material" denotes a graph showing a content of the metallic element according to a depth of the center from a surface of the particle when the X axis represents the depth of the center from the surface of the particle and the Y axis represents the content of the metallic element. For example, that an average slope of the concentration profile is positive denotes that a relatively greater amount of the corresponding metallic element is disposed in a particle center portion than in a particle surface portion, and, that the average slope is negative denotes that a relatively greater amount of the metallic element is disposed in the particle surface portion than in the particle center portion. In the present invention, the concentration gradient and concentration profile of the metal in the active material particle may be identified by using a method such as X-ray photoelectron spectroscopy (XPS), electron spectroscopy for chemical analysis (ESCA), electron probe microanalysis (EPMA), inductively coupled plasma-atomic emission spectroscopy (ICP-AES), or time of flight secondary ion mass spectrometry (ToF-SIMS). Specifically, in a case in which the profile of the metallic element in the active material is identified by XPS, an atomic ratio of each metal is measured for each etching time while etching the active material from the surface of the particle in a center direction, and the concentration profile of the metallic element may be identified therefrom.

Specifically, in the positive electrode active material according to the embodiment of the present invention, the at least one metallic element of the nickel, the cobalt, and the M1 may have a concentration gradient in which the concentration of the metal is gradually changed across the entire active material particle, and a concentration gradient slope of the metallic element in the active material particle may have one or more values. Since the metallic element has a continuous concentration gradient, an abrupt phase boundary region is not present from the center to the surface, and thus, its crystal structure is stabilized and thermal stability is increased. Also, in a case in which the concentration gradient slope of the metal is constant, the effect of improvement in the structural stability may be further improved. Furthermore, since the concentration of each metal in the active material particle is changed by the concentration gradient, the effect of the positive electrode active material on the improvement of the battery performance may be further improved by easily using properties of the corresponding metal.

In the present invention, the expression "the concentration of the metal has a gradually changing gradient" denotes that the metal has a concentration distribution in which the concentration of the metal is gradually changed across the entire particle. Specifically, in the concentration distribution, the metal concentration per 1 μm in the particle may have a difference of 0.1 at % to 30 at %, particularly 0.1 at % to 20 at %, and more particularly 1 at % to 10 at % based on a total atomic weight of the corresponding metal included in the active material particle.

Specifically, in the positive electrode active material, the concentration of the nickel included in the active material may be decreased while the nickel has a continuous concentration gradient from the center of the active material particle in a surface direction of the particle. In this case, a concentration gradient slope of the nickel may be constant from the center of the active material particle to the surface thereof. In a case in which the nickel has a concentration gradient in which a high concentration of the nickel is maintained at the particle center in the active material particle and the concentration is decreased from the center of the particle to the surface thereof, thermal stability of the positive electrode active material may be improved.

Also, in the positive electrode active material, the concentration of the M1 included in the active material may be increased while the M1 has a continuous concentration gradient from the center of the active material particle in the surface direction of the particle. In this case, a concentration gradient slope of the M1 may be constant from the center of the active material particle to the surface thereof. In a case in which the M1 has a concentration gradient in which a low concentration of the M1, particularly manganese, is maintained at the particle center in the active material particle and the concentration is increased from the center of the particle to the surface thereof, the thermal stability may be improved without a decrease in capacity of the positive electrode active material. Specifically, the M1 may be Mn.

Furthermore, in the positive electrode active material, the concentration of the cobalt included in the active material may be increased while the cobalt has a continuous concentration gradient from the center of the active material particle in the surface direction of the particle. In this case, a concentration gradient slope of the cobalt may be constant from the center of the active material particle to the surface thereof. In a case in which the cobalt has a concentration gradient in which a low concentration of the cobalt is maintained at the particle center in the active material particle and the concentration is increased from the center of the particle to the surface thereof, capacity characteristics of the positive electrode active material may be improved while reducing the amount of the cobalt used.

Also, in the positive electrode active material according to the embodiment of the present invention, the amount of the nickel included in the core may be greater than the amount of the nickel included in the shell, the core may specifically include the nickel in an amount of 60 mol % or more to less than 100 mol % based on a total mole of the transition metal elements included in the core, and the shell may include the nickel in an amount of 30 mol % or more to less than 65 mol % based on a total mole of the transition metal elements included in the shell.

Furthermore, in the positive electrode active material according to the embodiment of the present invention, the amount of the manganese included in the core may be smaller than the amount of the manganese included in the shell.

Also, in the positive electrode active material according to the embodiment of the present invention, the amount of the cobalt included in the core may be smaller than the amount of the cobalt included in the shell.

Furthermore, in the positive electrode active material according to the embodiment of the present invention, the nickel, the manganese, the cobalt each independently may have a continuously changing concentration gradient across the entire active material particle, the concentration of the nickel may be decreased while the nickel has a continuous concentration gradient from the center of the active material particle in the surface direction, and the concentrations of the cobalt and the manganese may be increased while the cobalt and the manganese each independently have a continuous concentration gradient from the center of the active material particle in the surface direction.

Also, in the positive electrode active material according to the embodiment of the present invention, the nickel, the manganese, the cobalt each independently may have a continuously changing concentration gradient in the core and the shell, the concentration of the nickel may be decreased while the nickel has a continuous concentration gradient from the center of the core to an interface between the core and the buffer layer and from an interface between the buffer layer and the shell to a surface of the shell, and the concentrations of the cobalt and the manganese may be increased while the cobalt and the manganese each independently may have a continuous concentration gradient from the center of the core to the interface between the core and the buffer layer and from the interface between the buffer layer and the shell to the surface of the shell.

Thus, since the positive electrode active material according to the embodiment of the present invention has a combined concentration gradient, in which the concentration of the nickel is decreased and the concentrations of the manganese and cobalt are increased from the center to the surface of the positive electrode active material particle, partially in the active material or across the entire active material, thermal stability may be obtained while maintaining the capacity characteristics.

Furthermore, in the active material, the nickel, the M1, and the cobalt each independently may have a changing concentration gradient across the entire active material particle, the concentration of the nickel may be decreased while the nickel has a continuous concentration gradient from the center of the active material particle in the surface direction, and the concentrations of the cobalt and the M1 may be increased while the cobalt and the M1 each independently have a continuous concentration gradient from the center of the active material particle in the surface direction. Thus, since the positive electrode active material according to the embodiment of the present invention has a combined concentration gradient, in which the concentration of the nickel is decreased and the concentrations of the M1 and cobalt are increased from the center to the surface of the active material particle, across the entire active material, the thermal stability may be improved while maintaining the capacity characteristics of the positive electrode active material.

The positive electrode active material according to the embodiment of the present invention having the above-described structure may be a secondary particle in which primary particles are assembled.

Specifically, the positive electrode active material may have an average particle diameter ($D_{50}$) of 2 μm to 20 μm, for example, 3 μm to 15 μm. In a case in which the average particle diameter of the positive electrode active material is less than 2 μm, there is a concern that stability of the polycrystalline lithium composite metal oxide particles may be reduced, and, in a case in which the average particle diameter of the positive electrode active material is greater than 20 μm, there is a concern that the output characteristics of the secondary battery may be reduced. Also, since the positive electrode active material according to the present invention satisfies the average particle diameter of the secondary particle and the above-described grain diameter at the same time, the positive electrode active material according to the present invention may have more improved output characteristics as well as excellent structural stability when used in the battery.

In the present invention, the average particle diameter ($D_{50}$) of the positive electrode active material may be defined as a particle diameter at 50% in a cumulative particle diameter distribution. In the present invention, the average particle diameter ($D_{50}$) of the positive electrode active material, for example, may be measured by electron microscopy using a scanning electron microscope (SEM) or field emission scanning electron microscope (FE-SEM), or using a laser diffraction method. Specifically, when measured by the laser diffraction method, particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

Also, in the positive electrode active material, a ratio of a radius of the core to a radius of the positive electrode active material may be greater than 0 to less than 0.4, particularly 0.01 to 0.2, and more particularly 0.1 to 0.2, and a ratio of a length from the center of the positive electrode active material to the interface between the buffer layer and the shell to the radius of the positive electrode active material may be greater than 0 to less than 0.7, particularly 0.01 to 0.5, and more particularly 0.1 to 0.3.

Furthermore, in the positive electrode active material, when a ratio of a thickness of the shell to the radius of the positive electrode active material is referred to as a shell region, the shell region determined according to the following Equation 1 may be in a range of 0.2 to 1, particularly 0.25 to 0.7, and more particularly 0.5 to 0.6.

Shell region=(radius of positive electrode active material-core radius-buffer layer thickness)/radius of positive electrode active material [Equation 1]

In a case in which the core, the buffer layer, and the shell are formed in the positive electrode active material at the above-described ratios and the concentration gradient of the metallic element is formed in each region, the destruction of the positive electrode active material due to the rolling process during the preparation of the electrode is minimized and the reactivity with the electrolyte solution is maximized by further optimizing and controlling the distribution of the nickel, the cobalt, and the M1 in the active material particle, and thus, the output characteristics and life characteristics of the secondary battery may be further improved.

In the present invention, a diameter of the core portion may be measured by particle section analysis using a forced ion beam (FIB).

Also, the positive electrode active material according to the embodiment of the present invention may have a Brunauer-Emmett-Teller (BET) specific surface area of 0.1 $m^2/g$ to 1.9 $m^2/g$. In a case in which the BET specific surface area of the positive electrode active material is greater than 1.9 $m^2/g$, dispersion of the positive electrode active material in the active material layer may be reduced and resistance in the electrode may be increased due to the agglomeration of the positive electrode active material, and, in a case in which the BET specific surface area is less than 0.1 $m^2/g$, dispersion of the positive electrode active material itself may be reduced and the capacity may be reduced.

In the present invention, the specific surface area of the positive electrode active material is measured by a BET method, wherein, specifically, the specific surface area may be calculated from a nitrogen gas adsorption amount at a liquid nitrogen temperature (77K) using BELSORP-mini II by Bell Japan Inc.

Also, since the positive electrode active material according to the embodiment of the present invention satisfies the above-described average particle diameter and BET specific surface area conditions at the same time, excellent capacity and charge and discharge characteristics may be obtained. For example, the positive electrode active material may have an average particle diameter ($D_{50}$) of 3 μm to 15 μm and a BET specific surface area of 0.15 $m^2/g$ to 1.5 $m^2/g$.

Furthermore, the positive electrode active material according to the embodiment of the present invention may have a tap density of 1.2 g/cc or more, or 1.2 g/cc to 2.5 g/cc. The positive electrode active material of the present invention may exhibit high capacity characteristics by having high tap density within the above-described range. In the present invention, the tap density of the positive electrode active material may be measured by using a typical tap density meter, and, particularly, may be measured by using a tap density tester.

The positive electrode active material having the above-described structure and physical properties according to the embodiment of the present invention may be prepared by a method including the steps of: preparing a precursor-containing reaction solution by adding an ammonium cation-containing complexing agent and a basic compound to a metal-containing solution, which is prepared by mixing a nickel raw material, a cobalt raw material, and a M1 raw material (where, M1 includes at least one element selected from the group consisting of Al and Mn), and performing a co-precipitation reaction in a pH range of 11 to 13 (step 1); growing the precursor by adding an ammonium cation-containing complexing agent and a basic compound to the precursor-containing reaction solution until a pH of the reaction solution reaches or more to less than 11 (step 2); and mixing the grown precursor with a lithium raw material and performing primary sintering at 500° C. to 700° C. and secondary sintering at 700° C. to 900° C. (step 3), wherein a M3 raw material (where, M3 includes at least one element selected from the group consisting of W, Mo, and Cr) is further added during at least one process of the preparing of the metal-containing solution and the mixing of the grown precursor with the lithium raw material. In a case in which the positive electrode active material further includes M2 (where, M2 includes at least one element selected from the group consisting of Zr, Ti, Mg, Ta, and Nb), a M2 raw material may be added during the mixing of the raw materials of each metallic element in step 1 or the M2 raw material may be added during the mixing with the lithium raw material in step 2. Thus, according to another embodiment of the present invention, provided is a method of preparing the above-described positive electrode active material.

Hereinafter, each step will be described in detail, and, in the method of preparing the positive electrode active material, step 1 is a step of preparing a precursor using a nickel raw material, a cobalt raw material, a M1 raw material, and selectively a M3 or M2 raw material.

Specifically, the precursor may be prepared by adding an ammonium cation-containing complexing agent and a basic compound to a metal-containing solution, which is prepared by mixing the nickel raw material, the cobalt raw material, the M1 raw material, and selectively the M3 or M2 raw material, and performing a co-precipitation reaction. In this case, a mixing ratio of each raw material may be appropriately determined within a range that satisfies the content condition of each metallic element in the finally prepared positive electrode active material.

The metal-containing solution may be prepared by respectively adding the nickel raw material, the cobalt raw material, the M1 raw material, and selectively the M3 or M2 raw material to a solvent, particularly water, or a mixture of water and an organic solvent (specifically, alcohol etc.) which may be uniformly mixed with the water, or solutions, particularly aqueous solutions, including each of the metal-containing raw materials are prepared, and these solutions may then be mixed and used.

An acetic acid salt, nitrate, sulfate, halide, sulfide, hydroxide, oxide, or oxyhydroxide may be used as the metal-containing raw materials, and the metal-containing raw materials are not particularly limited as long as the materials may be dissolved in water.

For example, the cobalt raw material may include $Co(OH)_2$, $CoOOH$, $Co(OCOCH_3)_2 \cdot 4H_2O$, $Co(NO_3)_2 \cdot 6H_2O$, or $Co(SO_4)_2 \cdot 7H_2O$, and any one thereof or a mixture of two or more thereof may be used.

Also, the nickel raw material may include $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, or a nickel halide, and any one thereof or a mixture of two or more thereof may be used.

Furthermore, as the M1 raw material, an acetic acid salt, nitrate, sulfate, halide, sulfide, hydroxide, oxide, or oxyhydroxide containing the M1 element may be used. For example, in a case in which the M1 is Mn, the manganese raw material may include a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; an oxyhydroxide, and manganese chloride, and any one thereof or a mixture of two or more thereof may be used. Also, in a case in which the M1 is Al, the aluminum raw material may include $AlSO_4$, $AlCl$, or $AlNO_3$, and any one thereof or a mixture of two or more thereof may be used.

Also, as the M2 raw material, an acetic acid salt, nitrate, sulfate, halide, sulfide, hydroxide, oxide, or oxyhydroxide containing the M2 element may be used.

For example, in a case in which the M2 is Ti, titanium oxide may be used. The M2 raw material may be used within a range that satisfies the content condition of the M2 element in the finally prepared positive electrode active material.

Furthermore, as the M3 raw material, an acetic acid salt, nitrate, sulfate, halide, sulfide, hydroxide, oxide, or oxyhydroxide containing the M3 element may be used. For example, in a case in which the M3 is W, tungsten oxide may be used. The M3 raw material may be used within a range that satisfies the content condition of the M3 element in the finally prepared positive electrode active material.

Also, the ammonium cation-containing complexing agent may specifically include $NH_4OH$, $(NH_4)_2SO_4$, $NH_4NO_3$, $NH_4Cl$, $CH_3COONH_4$, or $NH_4CO_3$, and any one thereof or a mixture of two or more thereof may be used. Also, the ammonium cation-containing complexing agent may be used in the form of an aqueous solution, and, in this case, water or a mixture of water and an organic solvent (specifically, alcohol etc.), which may be uniformly mixed with the water, may be used as a solvent.

The ammonium cation-containing complexing agent may be added in an amount such that a molar ratio of the ammonium cation-containing complexing agent to 1 mole of the metal salt solution becomes 0.5 to 1. In general, a chelating agent reacts with metal at a molar ratio equal to or greater than 1:1 to form a complex, but, since an unreacted complex, which does not react with a basic aqueous solution, among the formed complex may be changed into an intermediate product to be recovered and reused as the chelating agent, the amount of the chelating agent used may be reduced in the present invention, in comparison to a conventional case. As a result, crystallinity of the positive electrode active material may be increased and stabilized.

Furthermore, the basic compound may include a hydroxide of alkali metal or alkaline earth metal, such as NaOH, KOH, or $Ca(OH)_2$, or a hydrate thereof, and any one thereof or a mixture of two or more thereof may be used. The basic compound may also be used in the form of an aqueous solution, and, in this case, water or a mixture of water and an organic solvent (specifically, alcohol etc.), which may be uniformly mixed with the water, may be used as a solvent.

Also, the co-precipitation reaction may be performed in a pH range of 11 to 13. In a case in which the pH is outside the above range, there is a concern that a diameter of the prepared precursor may be changed or particle breakage may occur. Furthermore, since metal ions are eluted on the surface of the precursor, there is a concern that various oxides may be formed by a side reaction. Specifically, the co-precipitation reaction may be performed under a condition in which the pH of the mixed solution is in a range of 11 to 12.

In order to satisfy the above-described pH range, the ammonium cation-containing complexing agent and the basic compound may be used in a molar ratio of 1:10 to 1:2. In this case, the pH value denotes a pH value measured at a liquid temperature of 25° C.

Also, the co-precipitation reaction may be performed in a temperature range of 40° C. to 70° C. in an inert atmosphere such as nitrogen or argon. Furthermore, a stirring process may be selectively performed to increase the reaction rate during the reaction, and, in this case, a stirring speed may be in a range of 100 rpm to 2,000 rpm.

Furthermore, in a case in which the concentration gradient of the metallic element is desired to be formed in the finally prepared positive electrode active material, step 1 may be performed by preparing a second metal-containing solution including nickel, cobalt, and M1-containing metal salts and selectively a M2-containing metal salt in a concentration different from that of the above-described metal-containing solution, then adding an ammonium cation-containing complexing agent and a basic compound as well as the second metal-containing solution to the metal-containing solution to allow a mixing ratio of the metal-containing solution to the second metal-containing solution to be gradually changed from 100 vol %:0 vol % to 0 vol %:100 vol %, and performing a reaction.

Since reaction rate and reaction time are controlled while continuously increasing an amount of the second metal-containing solution added to the metal-containing solution, a composite metal hydroxide, which has a concentration gradient in which the nickel, the cobalt, and the M1 each independently are continuously changed from the center of the particle to the surface thereof, may be prepared by a single co-precipitation reaction process. The concentration gradient of the metal in the hydroxide prepared in this case and its slope may be easily adjusted by compositions and a mixed feed ratio of the metal-containing solution and the second metal-containing solution. In order to produce a high density state in which the concentration of the specific metal is high, it is describable to increase the reaction time and decrease the reaction rate, and, in order to produce a low density state in which the concentration of the specific metal is low, it is describable to decrease the reaction time and increase the reaction rate.

Specifically, a rate of the second metal-containing solution added to the metal-containing solution may be continuously increased within a range of 1% to 30% of an initial feed rate. Specifically, a feed rate of the metal-containing solution may be in a range of 150 ml/hr to 210 ml/hr, the feed rate of the second metal-containing solution may be in a range of 120 ml/hr to 180 ml/hr, and the feed rate of the second metal-containing solution may be continuously increased within a range of 1% to 30% of the initial feed rate and within the above feed rate range. In this case, the reaction may be performed in a temperature range of 40° C. to 70° C. Also, the diameter of the precursor particle may be controlled by adjusting the amount of the second metal-containing solution added to the metal-containing solution and the reaction time.

Particles of the composite metal hydroxide, as the precursor, are formed and precipitated in the reaction solution by the above-described process. Specifically, the precursor may include a compound of the following Formula 2.

$$Ni_{1-x-y}Co_xM1_yM3_zM2_wOH \quad \text{[Formula 2]}$$

(in Formula 2, M1, M2, M3, x, y, z, and w are the same as previously defined)

The precursor precipitated as a result of the reaction is separated according to a conventional method, and a drying process may then be selectively performed.

The drying process may be performed by a typical drying method, and may be specifically performed for 15 hours to 30 hours by a method such as heating in a temperature range of 100° C. to 120° C. or hot air injection.

Next, in the method of preparing the positive electrode active material, step 2 is a process of growing the metal-containing hydroxide particles prepared in step 1.

Specifically, the transition metal-containing hydroxide particles may be grown by adding the ammonium cation-containing complexing agent and the basic compound to the reaction solution, in which the metal-containing hydroxide particles are formed, until the pH of the reaction solution is lower than the pH during the co-precipitation reaction.

Specifically, a total amount of moles of nickel ions, cobalt ions, and manganese ions may be in a range of 0.5 M to 2.5 M, or 1 M to 2.2 M. Also, in order to maintain such an ion concentration, it is desirable to continuously provide the transition metal raw materials depending on a precipitation rate of the transition metal hydroxide.

Furthermore, the growing of the metal-containing hydroxide particles in step 2 may be performed at a pH, which is lower than the pH in the formation of the metal-containing hydroxide particles in step 1, and, specifically, may be performed in a pH range of 8 or more to less than 11, for example, in a pH range of 8 to 10.5, which is lower than the pH in step 1.

Also, the growing of the nickel-cobalt-manganese composite metal-containing hydroxide particles may be performed by changing the pH of the reactant at a rate of 1/hr to 2.5/hr. Since the growing of the nickel-cobalt-manganese composite metal-containing hydroxide particles is performed at the pH, which is lower than the pH during the co-precipitation reaction, and the above-described pH change rate, a desired particle structure may be easily formed.

Furthermore, when adding the ammonium cation-containing complexing agent and the basic compound to the reaction solution in which the metal-containing hydroxide particles are formed, the ammonium cation-containing complexing agent and the basic compound may be added at the same rate, or may be added while the feed rates are continuously reduced. In a case in which the ammonium cation-containing complexing agent and the basic compound are added while the feed rates are reduced, the ammonium cation-containing complexing agent and the basic compound may be added while the feed rates are reduced at a reduction rate of 20% or more to less than 100%.

As described above, since the feed rates and concentrations of the ammonium cation-containing complexing agent and the basic compound and the reaction temperature are controlled, the precipitation rate of the transition metal hydroxide in the particle growing step is allowed to be faster than the precipitation rate of the lithium transition metal hydroxide in step 1. As a result, density near an outer surface of the transition metal hydroxide particles, which become the precursor, is decreased to facilitate particle growth during the subsequent heat treatment process.

The process of step 2 may be performed in an inert atmosphere.

After the process of step 2, the grown transition metal hydroxide particles are separated from the reaction solution, and processes of washing and drying may then be selectively further performed.

The drying process may be performed by a typical drying method, and may be specifically performed by a method such as heating in a temperature range of 100° C. to 120° C. or hot air injection.

In the method of preparing the positive electrode active material, step 3 is a step of mixing the metal-containing hydroxide particles grown in step 2 with a lithium raw material and selectively a M3 or M2 raw material and performing a sintering treatment to prepare a positive electrode active material. In this case, the M3 and M2 raw materials are the same as described above.

The lithium raw material may include a lithium-containing carbonate (e.g., lithium carbonate etc.), hydrate (e.g., lithium hydroxide monohydrate (LiOH.H$_2$O) etc.), hydroxide (e.g., lithium hydroxide etc.), nitrate (e.g., lithium nitrate (LiNO$_3$) etc.), or chloride (e.g., lithium chloride (LiCl) etc.), and any one thereof or a mixture of two or more thereof may be used. Also, an amount of the lithium raw material used may be determined according to amounts of the lithium and the transition metal in the finally prepared lithium composite metal oxide, and, specifically, the lithium raw material may be used in an amount such that a molar ratio (molar ratio of lithium/metallic element (Me)) of lithium included in the lithium raw material to the metallic element (Me) included in the composite metal hydroxide is 1.0 or more.

Also, the sintering process may be performed in multiple stages including primary sintering at 250° C. to 500° C. and secondary sintering at 700° C. to 900° C.

The primary sintering is for increasing sintering rate during the secondary sintering, and physical properties including the above-described grain diameter may be achieved by subsequently performing the secondary sintering at a temperature higher than that of the primary sintering. Specifically, the sintering process may be performed in two stages including primary sintering at 400° C. to 500° C. and secondary sintering at 750° C. to 850° C.

Furthermore, the sintering process may be performed in an air atmosphere or oxidizing atmosphere (e.g., O$_2$ etc.), and, for example, may be performed in an oxidizing atmosphere at an oxygen partial pressure of 20 vol % or more. Also, the sintering process may be performed under the above-described condition for 5 hours to 48 hours, or 10 hours to 20 hours.

Furthermore, a sintering aid may be further selectively added during the sintering process.

When the sintering aid is added, crystals may be easily grown at low temperature and a non-uniform reaction during dry mixing may be minimized. Also, the sintering aid has an effect of forming edges of the lithium composite metal oxide primary particles into a curved round shape by blunting the edges thereof. Generally, in a lithium oxide-based positive electrode active material including manganese, the dissolution of manganese frequently occurs from the edges of the particles, and characteristics, particularly, high-temperature life characteristics, of the secondary battery are reduced due to the dissolution of manganese. In a case in which the sintering aid is used, a dissolution area of the manganese may be reduced by forming the edges of the primary particles into curved round edges, and, as a result, the stability and life characteristics of the secondary battery may be improved.

Specifically, the sintering aid may include a boron compound such as boric acid, lithium tetraborate, boron oxide, and ammonium borate; a cobalt compound such as cobalt oxide (II), cobalt oxide (III), cobalt oxide (IV), and tricobalt tetraoxide; a vanadium compound such as vanadium oxide; a lanthanum compound such as lanthanum oxide; a zirconium compound such as zirconium boride, calcium zirconium silicate, and zirconium oxide; an yttrium compound such as yttrium oxide; or a gallium compound such as gallium oxide, and any one thereof or a mixture of two or more thereof may be used.

The sintering aid may be used in an amount of 0.2 part by weight to 2 parts by weight, for example, 0.4 part by weight to 1.4 parts by weight based on a total weight of the precursor.

Also, a water-removing agent may be further selectively added during the sintering process. Specifically, the water-removing agent may include citric acid, tartaric acid, glycolic acid, or maleic acid, and any one thereof or a mixture of two or more thereof may be used. The water-removing agent may be used in an amount of 0.01 part by weight to 2 parts by weight based on the total weight of the precursor.

With respect to the metal-containing hydroxide particles formed and grown through steps 1 and 2, crystals of the inside of the particle and crystals of the outside of the particle formed by the subsequent particle growth have different properties due to a difference in process conditions, i.e., pH etc., during the preparation process. Accordingly, since the crystals of the inside, which are formed when the pH is high, shrink during the above-described sintering process and the crystals formed at low pH and temperature grow, the shrunken crystals form the core, and the crystals grown outside form the shell. In addition, since the core and the shell are formed as described above, pores may be formed between the core and the shell, and, at the same time, crystals disposed between the core and the shell may form the three-dimensional network structure connecting the inside and the outside of the particle. Also, the crystals of the outside of the particle radially grow from the center of the particle to the outside to have a crystal orientation.

Since the positive electrode active material prepared according to the above-described preparation method includes the buffer layer including the pores between the core and shell by controlling the pH, concentration, and rate of the reactant, the destruction of the active material during the rolling in an electrode preparation process is minimized and the reactivity with an electrolyte solution is maximized. In addition, since the particles constituting the shell have a crystal structure aligned for facilitating the intercalation and deintercalation of lithium ions, resistance of the secondary battery may be reduced and life characteristics of the secondary battery may be improved. Simultaneously, since the distribution of the transition metal is controlled across the entire active material particle, high capacity, long lifetime, and thermal stability may be obtained when the positive electrode active material is used in the battery and, at the same time, performance degradation at a high voltage may be minimized.

Furthermore, the positive electrode active material prepared by the above-described processes may exhibit high output characteristics, particularly, excellent output characteristics at low temperature, by controlling the grain diameter as described above. Also, the distribution of the transition metal in the positive electrode active material is further controlled, and, as a result, the thermal stability is improved so that the performance degradation at a high voltage may be minimized.

Thus, according to another embodiment of the present invention, provided are a positive electrode and a lithium secondary battery which include the above-described positive electrode active material.

Specifically, the positive electrode includes a positive electrode collector and a positive electrode active material layer formed on the positive electrode collector and including the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may further selectively include at least one of a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the above-described positive electrode active material and at least one of the binder and the conductive agent, if necessary, in a solvent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode, which selectively includes the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x(0<x<2)$, $SnO_x$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an esterbased solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles.

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1: Preparation of Positive Electrode Active Material

In a 5 L batch-type reactor set at 60° C., nickel sulfate, cobalt sulfate, manganese sulfate, and sodium tungstate dehydrate, as a tungsten-containing raw material, were mixed in water in a molar ratio of 80:10:10:0.25 based on a molar ratio of the metallic element included in each compound to prepare a first metal salt solution with a concentration of 2M, and nickel sulfate, cobalt sulfate, manganese sulfate, and sodium tungstate dehydrate, as a tungsten-containing raw material, were mixed in water in a molar ratio of 20:50:30:0.25 based on a molar ratio of the metallic element included in each compound to prepare a second metal salt solution with a concentration of 2M. A container containing the first metal salt solution was connected to the reactor, and a container containing the second metal salt solution was connected to the container containing the first metal salt solution. In addition, a 4M NaOH solution and a 7% $NH_4OH$ aqueous solution were prepared and connected to the reactor, respectively.

3 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 100 ml of 4M NaOH was added, and stirring was then performed at a speed of 1,200 rpm and a temperature of 60° C. to maintain a pH at 12.0. Subsequently, the first metal salt solution, the NaOH aqueous solution, and the $NH_4OH$ aqueous solution were respectively added at rates of 180 ml/hr, 180 ml/hr, and 10 ml/hr and reacted for 30 minutes to form seeds of first metal salt hydroxide. Thereafter, the NaOH aqueous solution and the $NH_4OH$ aqueous solution were added to reduce the pH at a rate of 2 per hour so that the pH was changed to 9.5, and, simultaneously, the second metal salt solution was added to the container containing the first metal salt solution at a rate of 150 ml/hr to induce the growth of hydroxide particles as well as the formation of a concentration gradient in the particle. Thereafter, the reaction was maintained for 24 hours to grow the nickel manganese cobalt-based composite metal hydroxide.

The nickel manganese cobalt-based composite metal hydroxide particles thus formed were mixed with a lithium hydroxide, as a lithium raw material, so that a molar ratio of lithium (Li):composite metal (Me) was 1:1.07, and the mixture was then subjected to a primary heat treatment at 500° C. for 10 hours and a secondary heat treatment at 820° C. for 10 hours in an oxidizing atmosphere (oxygen partial pressure of 20%) to prepare a positive electrode active material.

Example 2: Preparation of Positive Electrode Active Material

In a 5 L batch-type reactor set at 60° C., nickel sulfate, cobalt sulfate, manganese sulfate, and sodium tungstate dehydrate, as a tungsten-containing raw material, were mixed in water in a molar ratio of 60:20:20:0.25 based on a molar ratio of the metallic element included in each compound to prepare a metal salt solution with a concentration of 2M. A container containing the metal salt solution was connected to the reactor, and, in addition, a 4M NaOH solution and a 7% NH$_4$OH aqueous solution were prepared and connected to the reactor, respectively.

3 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 100 ml of 4M NaOH was added, and stirring was then performed at a speed of 1,200 rpm and a temperature of 60° C. to maintain a pH at 12.0. Subsequently, the metal salt solution, the NaOH aqueous solution, and the NH$_4$OH aqueous solution were respectively added at rates of 180 ml/hr, 180 ml/hr, and 10 ml/hr and reacted for 30 minutes to form seeds of metal salt hydroxide. Thereafter, the NaOH aqueous solution and the NH$_4$OH aqueous solution were added to reduce the pH at a rate of 2 per hour so that the pH was changed to 9.5, and, simultaneously, the growth of hydroxide particles was induced. Thereafter, the reaction was maintained for 24 hours to grow the nickel manganese cobalt-based composite metal hydroxide.

The nickel manganese cobalt-based composite metal hydroxide particles thus formed were mixed with a lithium hydroxide, as a lithium raw material, so that a molar ratio of lithium (Li):composite metal (Me) was 1:1.07, and the mixture was then subjected to a primary heat treatment at 500° C. for 10 hours and a secondary heat treatment at 820° C. for 10 hours in an oxidizing atmosphere (oxygen partial pressure of 20%) to prepare a positive electrode active material.

Example 3: Preparation of Positive Electrode Active Material

In a 5 L batch-type reactor set at 60° C., nickel sulfate, cobalt sulfate, manganese sulfate, and sodium tungstate dehydrate, as a tungsten-containing raw material, were mixed in water in a molar ratio of 60:20:20:0.25 based on a molar ratio of the metallic element included in each compound to prepare a metal salt solution with a concentration of 2M. A container containing the metal salt solution was connected to the reactor, and, in addition, a 4M NaOH solution and a 7% NH$_4$OH aqueous solution were prepared and connected to the reactor, respectively.

3 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 100 ml of 4M NaOH was added, and stirring was then performed at a speed of 1,200 rpm and a temperature of 60° C. to maintain a pH at 12.0. Subsequently, the metal salt solution, the NaOH aqueous solution, and the NH$_4$OH aqueous solution were respectively added at rates of 180 ml/hr, 180 ml/hr, and 10 ml/hr and reacted for 30 minutes to form seeds of metal salt hydroxide. Thereafter, the NaOH aqueous solution and the NH$_4$OH aqueous solution were added to reduce the pH at a rate of 2 per hour so that the pH was changed to 9.5, and, simultaneously, the growth of hydroxide particles was induced. Thereafter, the reaction was maintained for 24 hours to grow the nickel manganese cobalt-based composite metal hydroxide.

The nickel manganese cobalt-based composite metal hydroxide particles thus formed were mixed with a lithium hydroxide, as a lithium raw material, and a magnesium hydroxide so that a molar ratio of lithium (Li):composite metal (Me=metals except lithium and magnesium):Mg was 1:1.07:0.01, and the mixture was then subjected to a primary heat treatment at 500° C. for 10 hours and a secondary heat treatment at 820° C. for 10 hours in an oxidizing atmosphere (oxygen partial pressure of 20%) to prepare a positive electrode active material.

Comparative Example 1: Preparation of Positive Electrode Active Material

In a 5 L batch-type reactor set at 60° C., nickel sulfate, cobalt sulfate, and manganese sulfate were mixed in water in a molar ratio of 60:20:20 based on a molar ratio of the metallic element included in each compound to prepare a metal salt solution with a concentration of 2M. A container containing the metal salt solution was connected to the reactor, and a 4M NaOH solution and a 7% NH$_4$OH aqueous solution were prepared and connected to the reactor, respectively.

3 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 100 ml of 4M NaOH was added, and stirring was then performed at a speed of 1,200 rpm and a temperature of 60° C. to maintain a pH at 12.0. Subsequently, the metal salt solution, the NaOH aqueous solution, and the NH$_4$OH aqueous solution were respectively added at rates of 180 ml/hr, 180 ml/hr, and 10 ml/hr and reacted for 30 minutes to form seeds of metal salt hydroxide. Thereafter, the NaOH aqueous solution and the NH$_4$OH aqueous solution were added to reduce the pH at a rate of 2 per hour so that the pH was changed to 9.5, and, simultaneously, the growth of hydroxide particles was induced. Thereafter, the reaction was maintained for 24 hours to grow the nickel manganese cobalt-based composite metal hydroxide.

The nickel manganese cobalt-based composite metal hydroxide particles thus formed were mixed with a lithium hydroxide, as a lithium raw material, so that a molar ratio of lithium (Li):composite metal (Me) was 1:1.07, and the mixture was then subjected to a primary heat treatment at 500° C. for 10 hours and a secondary heat treatment at 820° C. for 10 hours in an oxidizing atmosphere (oxygen partial pressure of 20%) to prepare a positive electrode active material.

Reference Example: Preparation of Positive Electrode Active Material

In a 5 L batch-type reactor set at 60° C., nickel sulfate, cobalt sulfate, and manganese sulfate were mixed in water in a molar ratio of 80:10:10 based on a molar ratio of the metallic element included in each compound to prepare a first metal salt solution with a concentration of 2M, and nickel sulfate, cobalt sulfate, and manganese sulfate were mixed in water in a molar ratio of 20:50:30 based on a molar ratio of the metallic element included in each compound to prepare a second metal salt solution with a concentration of 2M. A container containing the first metal salt solution was connected to the reactor, and a container containing the second metal salt solution was connected to the container containing the first metal salt solution. In addition, a 4M NaOH solution and a 7% NH$_4$OH aqueous solution were prepared and connected to the reactor, respectively.

3 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 100 ml of 4M NaOH was added, and stirring was then performed at a speed of 1,200 rpm and a temperature of 60° C. to maintain a pH at 12.0. Subsequently, the first metal salt solution, the NaOH aqueous solution, and the NH$_4$OH aqueous solution were respectively added at rates of 180 ml/hr, 180 ml/hr, and 10 ml/hr and reacted for 30 minutes to form seeds of first metal salt hydroxide. Thereafter, the pH was reduced at a rate of 2 per hour so that the pH was changed to 9.5, and, simultaneously, the second metal salt solution was added to the container containing the first metal salt solution at a rate of 150 ml/hr to induce the growth of hydroxide particles as well as the formation of a concentration gradient in the particle. Thereafter, the reaction was maintained for 24 hours to grow the nickel manganese cobalt-based composite metal hydroxide.

The nickel manganese cobalt-based composite metal hydroxide particles thus formed were mixed with a lithium hydroxide, as a lithium raw material, so that a molar ratio of lithium (Li):composite metal (Me) was 1:1.07, and the mixture was then subjected to a primary heat treatment at 500° C. for 10 hours and a secondary heat treatment at 820° C. for 10 hours in an oxidizing atmosphere (oxygen partial pressure of 20%) to prepare a positive electrode active material.

Preparation Example: Manufacture of Lithium Secondary Batteries

Lithium secondary batteries were respectively manufactured by using the positive electrode active materials prepared in Examples 1 and 2, Comparative Example 1, and Reference Example.

Specifically, each of the positive electrode active materials prepared in Examples 1 and 2, Comparative Example 1, and Reference Example, a carbon black conductive agent, and a PVdF binder were mixed in an N-methylpyrrolidone solvent at a weight ratio of 95:2.5:2.5 to prepare a composition for forming a positive electrode (viscosity: 5,000 mPa·s), and an aluminum current collector was coated with the composition, dried at 130° C., and then rolled to prepared a positive electrode.

Also, as a negative electrode active material, natural graphite, a carbon black conductive agent, and a PVdF binder were mixed in an N-methylpyrrolidone solvent at a weight ratio of 85:10:5 to prepare a composition for forming a negative electrode, and a copper current collector was coated with the composition to prepared a negative electrode.

Each lithium secondary battery was manufactured by preparing an electrode assembly by disposing a porous polyethylene separator between the positive electrode and the negative electrode prepared as described above, disposing the electrode assembly in a case, and then injecting an electrolyte solution into the case. In this case, the electrolyte solution was prepared by dissolving 1.0 M lithium hexafluorophosphate (LiPF$_6$) in an organic solvent composed of ethylene carbonate/dimethyl carbonate/ethylmethyl carbonate (mixing volume ratio of EC/DMC/EMC=3/4/3).

Figure 2:
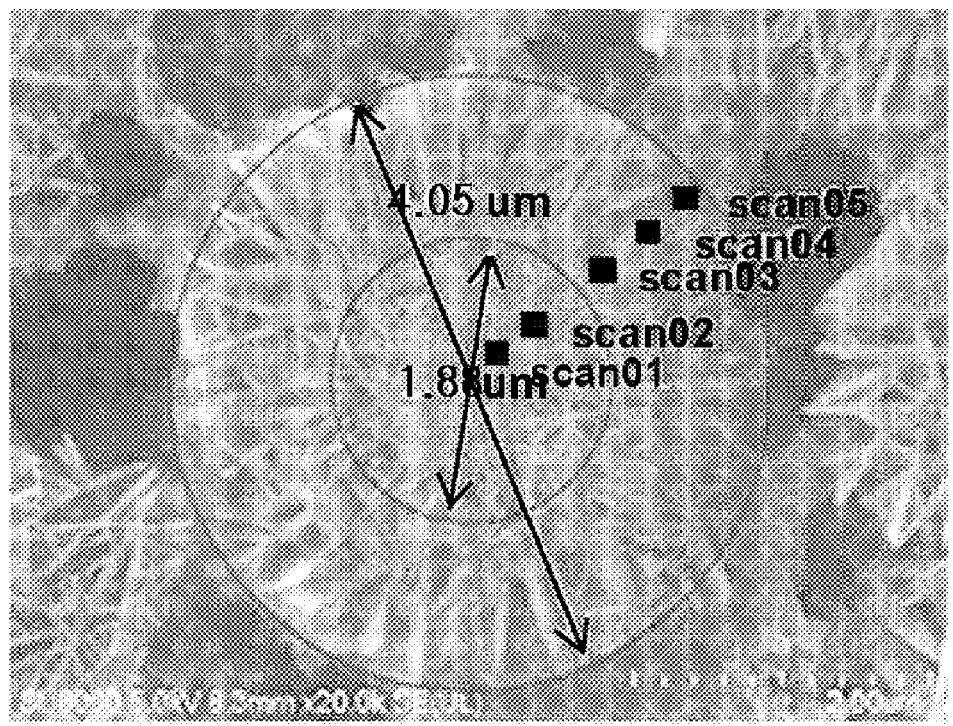
FIG. 2 is a field emission scanning electron microscope (FE-SEM) image of a precursor prepared in Example 1.

Experimental Example 1: Structural Observation of Positive Electrode Active Material The nickel manganese cobalt-based composite metal hydroxide particles prepared as a precursor of the positive electrode active material according to Example 1 were observed with a field emission scanning electron microscope (FE-SEM), and radii (with respect to the shell, corresponding to thickness) and volumes of a core and a shell were respectively calculated from the observation results. The results thereof are presented in FIG. 2 and Table 1 below.

TABLE 1

|  | Radius (μm) | Volume (μm$^3$) |
|---|---|---|
| Core | 0.94 | 3.5 |
| Shell | 1.085 | 31.3 |
| Total | 2.025 | 34.8 |

Also, the positive electrode active material prepared in Example 1 was processed by ion milling, and a cross-sectional structure of the positive electrode active material was then observed using a FE-SEM. The results thereof are presented in FIG. 3.

As a result of the observation of the cross-sectional structure, the formation of a buffer layer including a three-dimensional network structure between the core and the shell may be confirmed, and it may also be confirmed that particles in the shell had a crystal orientation from the center of the particle in a surface direction. Furthermore, a total particle diameter of the positive electrode active material was 4.3 μm, and, in a radius of the positive electrode active material of 2.15 μm, a thickness (radius) of the core was 0.4 μm, a thickness of the buffer layer was 0.6 μm, and a thickness of the shell was 1.15 μm. As a result of calculating porosity by converting volume ratios from the above results, the porosity of the buffer layer in the positive electrode active material was about 10 vol %.

In addition, BET specific surface area and tap density of the positive electrode active material prepared in Example 1 were respectively measured.

The BET specific surface area was calculated from a nitrogen gas adsorption amount at a liquid nitrogen temperature (77K) using BELSORP-mini II by Bell Japan Inc., and the tap density was measured by using a tap density tester.

As a result of the measurement, the positive electrode active material prepared in Example 1 had a BET specific surface area of 0.92 m$^2$/g and a tap density of 1.75 g/m$^3$.

Experimental Example 2: Observation of Grain Diameter of Positive Electrode Active Material Grain diameters of the polycrystalline lithium composite metal oxide particles of Examples 1 and 2, Comparative Example 1, and Reference Example were measured by X-ray diffraction (XRD) analysis.

Specifically, about 5 g of each of the polycrystalline lithium manganese oxide particles of Examples 1 and 2, Comparative Example 1, and Reference Example was put in a holder, each diffraction pattern obtained by irradiation of the particles with X-rays was analyzed, and the grain diameter and the amount of nickel (Ni) inserted into lithium sites were then obtained from a full width at half maximum of a main peak or three or more peaks. The results thereof are presented in Table 2 below.

TABLE 2

|  | a-axis (Å) | c-axis (Å) | Unit cell volume (Å³) | c/a | Grain diameter (nm) | Density (g/cc) | Ni occ. @ Li site (mol %) |
|---|---|---|---|---|---|---|---|
| Example 1 (W doping & concentration gradient) | 2.868 | 14.220 | 101.26 | 4.959 | 106 | 4.769 | 1.1 |
| Example 2 (W doping) | 2.867 | 14.216 | 101.19 | 4.959 | 108 | 4.772 | 1.0 |
| Comparative Example 1 (bare) | 2.866 | 14.210 | 101.1 | 4.959 | 178 | 4.777 | 1.1 |
| Reference Example (concentration gradient) | 2.867 | 14.212 | 101.14 | 4.958 | 157 | 4.774 | 0.6 |

According to the experimental results, the positive electrode active materials of Examples 1 and 2, in which the grain diameters of the polycrystalline lithium composite metal oxides constituting the active materials were controlled by W doping, had almost similar levels of the grain diameters and the amounts of nickel inserted into the lithium sites. In contrast, the positive electrode active materials of Comparative Example 1 and Reference Example, in which the grain diameters were not controlled, had large grain diameters of 150 nm or more, and, the positive electrode active material of Reference Example had a lower amount of nickel inserted into the lithium sites than that of Example 1.

Experimental Example 3: Identification of Concentration Gradients of Metallic Elements in Positive Electrode Active Material Component analysis was performed on the positive electrode active material prepared in Example 1 using EPMA. The results thereof are presented in FIG. 3 and Table 3 below.

TABLE 3

|  | Scan | Ni (mol %) | Co (mol %) | Mn (mol %) |
|---|---|---|---|---|
| Core | 01 | 68 | 18 | 14 |
| Buffer layer | 02 | 65 | 20 | 15 |
| Shell | 03 | 62 | 21 | 16 |
|  | 04 | 60 | 22 | 16 |
|  | 05 | 58 | 24 | 19 |
| Total |  | 60 | 23 | 17 |

Figure 3:
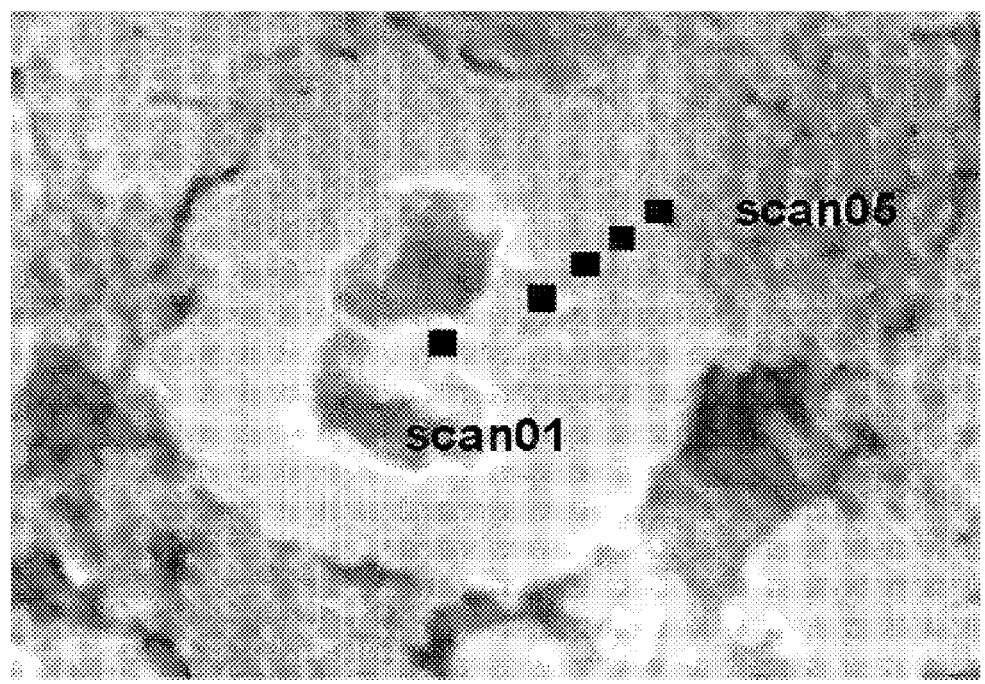
FIG. 3 is an FE-SEM image of a positive electrode active material prepared in Example 1 (observation magnification=30,000 times).

Positions of the scans in Table 3 were as illustrated in FIG. 3.

As illustrated in FIG. 3 and Table 3, although there was a difference in the concentration value, it may be also confirmed that the concentration of Ni was decreased and the concentrations of Co and Mn were increased from the center of the particle to the surface thereof in the positive electrode active material, similar to the precursor.

Experimental Example 4: Evaluation of Battery Characteristics of Lithium Secondary Battery Battery characteristics of the lithium secondary batteries respectively including the positive electrode active materials of Examples 1 and 2, Comparative Example 1, and Reference Example, which were prepared in Preparation Example, were evaluated by the following method.

Specifically, the lithium secondary batteries were charged and discharged 800 times at a temperature of 25° C. under conditions of 1 C/2 C within a driving voltage range of 2.8 V to 4.15 V.

Also, in order to evaluate output characteristics, resistance was measured by charging the battery, which was charged and discharged at room temperature (25° C.), based on a SOC of 50%, and, at a low temperature (−30° C.), a width of the voltage drop when the current was applied was measured based on a SOC of 50%.

As a result, resistances at room temperature (25° C.) and low temperature (−30° C.), and capacity retention, as a ratio of discharge capacity in a 800$^{th}$ cycle to initial capacity after the 800 cycles of charge and discharge at room temperature, were respectively measured, and the results thereof are presented in Table 4 below.

TABLE 4

|  | Room temperature (25° C.) resistance (mohm) | Voltage drop (V) at low temperature (−30° C.) | Capacity retention (%) at the 800$^{th}$ cycle at room temperature (25° C.) |
|---|---|---|---|
| Example 1 | 1.18 | 1.02 | 94.5 |
| Example 2 | 1.23 | 1.11 | 92.8 |
| Comparative Example 1 | 1.45 | 1.59 | 92.5 |
| Reference Example 1 | 1.34 | 1.25 | 95.4 |

From the experimental results, with respect to the lithium secondary battery including the positive electrode active material of Example 1, in which the buffer layer having pores and the three-dimensional network structure between the core and the shell according to the present invention was formed, the metallic elements of nickel, manganese, and cobalt were respectively distributed in a concentration gradient across the entire active material particle, and the grain diameter of the polycrystalline lithium composite metal oxide constituting the active material was controlled, and the lithium secondary battery including the positive electrode active material of Example 2 which was the same except that the metallic elements did not have a concentration gradient in comparison to Example 1, the resistance at room temperature and the voltage drop at low temperature were significantly reduced and the capacity retention was improved in comparison to the lithium secondary battery including the positive electrode active material of Comparative Example 1 in which a core-shell structure was not present, the concentration gradient of the metallic element was not formed, and the grain diameter of the lithium composite metal oxide constituting the active material was not controlled. Accordingly, it may be understood that the positive electrode active material according to the present invention had an excellent output characteristics and life characteristics improvement effect.

Also, the lithium secondary battery including the positive electrode active material of Example 1 had an equivalent level of excellent capacity retention, i.e., life characteristics, while having improved output characteristics at room temperature and low temperature in comparison to the lithium secondary battery including the positive electrode active material of Reference Example in which the core-shell structure and buffer layer were included and the metallic elements in the active material particle were distributed to have a concentration gradient, but the grain diameter of the lithium composite metal oxide constituting the active material was not controlled.

Furthermore, the lithium secondary battery including the positive electrode active material of Example 1 had a better output characteristics and life characteristics improvement effect than the lithium secondary battery including the positive electrode active material of Example 2 which was the same except that the metallic elements did not have a concentration gradient in comparison to Example 1.

The invention claimed is:

1. A positive electrode active material for a secondary battery, the positive electrode active material comprising:
    a core;
    a shell disposed to surround the core; and
    a buffer layer which is disposed between the core and the shell and includes pores and a three-dimensional network structure connecting the core and the shell,
    wherein the core, the shell, and the three-dimensional network structure of the buffer layer each independently comprise a polycrystalline lithium composite metal oxide of Formula 1 including a plurality of grains, and
    the grains have an average grain diameter of 50 nm to 150 nm:

$$Li_aNi_{1-x-y}Co_xM1_yM3_zM2_wO_2 \quad \text{[Formula 1]}$$

wherein, in Formula 1,
    M1 comprises at least one element selected from the group consisting of aluminum (Al) and manganese (Mn),
    M2 comprises at least one element selected from the group consisting of zirconium (Zr), titanium (Ti), magnesium (Mg), tantalum (Ta), and niobium (Nb),
    M3 is tungsten (W), and
    $1.0 \le a \le 1.5$, $0 < x \le 0.5$, $0 < y \le 0.5$, $0.0005 \le z \le 0.03$, $0 \le w \le 0.02$, and $0 < x+y \le 0.7$,
    wherein the core is composed of a single particle or a secondary particle in which primary particles are aggregated,
    the shell includes crystal oriented particles radially grown from a center of the positive electrode active material toward a surface, and
    wherein the positive electrode active material has a hollow structure.

2. The positive electrode active material for a secondary battery of claim 1, wherein at least one metallic element of the nickel, the cobalt, and the M1 has a concentration gradient that changes in a particle of the active material.

3. The positive electrode active material for a secondary battery of claim 1, wherein an amount of the nickel included in the core is greater than an amount of the nickel included in the shell.

4. The positive electrode active material for a secondary battery of claim 1, wherein an amount of the M1 included in the core is smaller than an amount of the M1 included in the shell.

5. The positive electrode active material for a secondary battery of claim 1, wherein an amount of the cobalt included in the core is smaller than an amount of the cobalt included in the shell.

6. The positive electrode active material for a secondary battery of claim 1, wherein an amount of the nickel included in the core is greater than an amount of the nickel included in the shell,
    the core comprises the nickel in an amount of 60 mol % or more to less than 100 mol % based on a total mole of the transition metal elements included in the core, and
    the shell comprises the nickel in an amount of 30 mol % or more to less than 65 mol % based on a total mole of the transition metal elements included in the shell.

7. The positive electrode active material for a secondary battery of claim 1, wherein the nickel, the cobalt, and the M1 are distributed in concentration gradients that each independently change across an entire active material particle,
    the nickel is distributed in a concentration gradient that decreases from a center of the active material particle in a surface direction, and
    the cobalt and the M1 are distributed in concentration gradients that each independently increase from the center of the active material particle in the surface direction.

8. The positive electrode active material for a secondary battery of claim 1, wherein a ratio of a radius of the core to a radius of the positive electrode active material is greater than 0 to less than 0.4, and
    a ratio of a length from a center of the positive electrode active material to an interface between the buffer layer and the shell to the radius of the positive electrode active material is greater than 0 to less than 0.7.

9. The positive electrode active material for a secondary battery of claim 1, wherein a shell region, as a ratio of a thickness of the shell to a radius of the positive electrode active material, determined according to Equation 1 is in a range of 0.2 to 1:

shell region=(radius of positive electrode active material−core radius−buffer layer thickness)/radius of positive electrode active material   [Equation 1].

10. The positive electrode active material for a secondary battery of claim 1, wherein the M1 is manganese (Mn) or aluminum (Al).

11. The positive electrode active material for a secondary battery of claim 1, wherein the positive electrode active material has an average particle diameter ($D_{50}$) of 2 μm to 20 μm, a Brunauer-Emmett-Teller (BET) specific surface area of 0.1 m²/g to 1.9 m²/g, and a tap density of 1.2 g/cc to 2.5 g/cc.

12. A positive electrode for a secondary battery, the positive electrode comprising the positive electrode active material of claim 1.

13. A lithium secondary battery comprising the positive electrode of claim 12.

14. A method of preparing the positive electrode active material for a secondary battery of claim 1, the method comprising:

preparing a precursor-containing reaction solution by adding an ammonium cation-containing complexing agent and a basic compound to a metal-containing solution, which is prepared by mixing a nickel raw material, a cobalt raw material, and a M1 raw material (where, M1 comprises at least one element selected from the group consisting of Al and Mn), and performing a co-precipitation reaction in a pH range of 11 to 13;

growing the precursor by further adding the ammonium cation-containing complexing agent and the basic compound to the precursor-containing reaction solution until a pH of the reaction solution reaches 8 or more to less than 11; and mixing the grown precursor with a lithium raw material and performing primary sintering at 500° C. to 700° C. and secondary sintering at 700° C. to 900° C., wherein a M3 raw material (where M3 is W) is further added in a molar ratio of 0.0005 to 0.03 based on a total mole of the metallic elements except lithium in a finally prepared lithium composite metal oxide during the preparing of the metal-containing solution or the mixing of the grown precursor with the lithium raw material.

15. The method of claim 14, wherein the growing of the precursor is performed by changing a pH of a reactant at a rate of 1 per hour to 2.5 per hour.

16. The method of claim 14, wherein the lithium raw material is used in an amount such that a molar ratio (molar ratio of lithium/metallic element (Me)) of lithium included in the lithium raw material to the metallic element (Me) included in the precursor is 1.0 or more.

17. The method of claim 14, wherein a second metal-containing solution including a nickel raw material, a cobalt raw material, and a M1 raw material in a concentration different from that of the metal-containing solution is further added in the preparing of the precursor-containing reaction solution.

18. The method of claim 14, wherein the primary sintering and the secondary sintering are each independently performed in an air or oxidizing atmosphere.

19. The method of claim 14, wherein the primary sintering and the secondary sintering are each independently performed in an atmosphere at an oxygen partial pressure of 20% or more.

* * * * *